United States Patent
Moreland

(10) Patent No.: US 11,022,712 B2
(45) Date of Patent: Jun. 1, 2021

(54) MULTI-FREQUENCY METAL DETECTOR

(71) Applicant: FIRST TEXAS PRODUCTS, LLC, El Paso, TX (US)

(72) Inventor: Carl W. Moreland, Junction City, OR (US)

(73) Assignee: First Texas Products, LLC, El Paso, TX (US)

( * ) Notice: Subject to any disclaimer, the term of this patent is extended or adjusted under 35 U.S.C. 154(b) by 0 days.

(21) Appl. No.: 16/014,630

(22) Filed: Jun. 21, 2018

(65) Prior Publication Data

US 2018/0372904 A1    Dec. 27, 2018

Related U.S. Application Data

(60) Provisional application No. 62/524,234, filed on Jun. 23, 2017.

(51) Int. Cl.
| | | |
|---|---|---|
| *G01V 3/10* | (2006.01) | |
| *G01V 3/02* | (2006.01) | |
| *G01V 3/165* | (2006.01) | |

(52) U.S. Cl.
CPC ............ *G01V 3/105* (2013.01); *G01V 3/02* (2013.01); *G01V 3/165* (2013.01)

(58) Field of Classification Search
None
See application file for complete search history.

(56) References Cited

U.S. PATENT DOCUMENTS

| | | | | |
|---|---|---|---|---|
| 5,537,041 A | * | 7/1996 | Candy | G01V 3/105 324/233 |
| 5,576,624 A | * | 11/1996 | Candy | G01V 3/02 324/239 |
| 5,642,050 A | * | 6/1997 | Shoemaker | G01V 3/105 324/232 |
| 5,654,638 A | * | 8/1997 | Shoemaker | G01V 3/104 324/225 |
| 6,724,191 B1 | | 4/2004 | Larsen | |
| 8,063,777 B2 | * | 11/2011 | Candy | G01V 3/104 324/329 |
| 8,629,677 B2 | | 1/2014 | Earle | |

(Continued)

FOREIGN PATENT DOCUMENTS

WO    WO2005/047932 A1    5/2005

OTHER PUBLICATIONS

Patent Cooperation Treaty, International Search Report and Written Opinion of the International Searching Authority, PCT/US2018/038766 to First Texas Products, LLC, dated Sep. 14, 2018, 14 pages.

(Continued)

*Primary Examiner* — Paresh Patel
(74) *Attorney, Agent, or Firm* — Faegre Drinker Biddle & Reath LLP

(57) ABSTRACT

A multi-frequency platform for metal detection is disclosed. The transmission frequencies may be selected by the user or in an autonomous fashion. Further, the weighting of the frequencies may also be selected, either by the user or in an autonomous fashion. The ability to select transmission frequencies and weighting of the frequencies provides expanded detection capability, both in terms of the types of targets being sought and the types of ground conditions being experienced.

37 Claims, 6 Drawing Sheets

(56) References Cited

U.S. PATENT DOCUMENTS

| | | | |
|---|---|---|---|
| 9,285,496 B1 | 3/2016 | Moreland | |
| 2008/0048661 A1* | 2/2008 | Candy | G01V 3/104 324/329 |
| 2008/0074114 A1* | 3/2008 | Candy | G01V 3/104 324/326 |
| 2010/0141247 A1* | 6/2010 | Candy | G01V 3/104 324/239 |
| 2010/0148781 A1* | 6/2010 | Candy | G01V 3/104 324/329 |
| 2010/0148960 A1* | 6/2010 | Candy | G01V 3/10 340/540 |
| 2012/0179394 A1 | 7/2012 | Kittel | |
| 2013/0154649 A1 | 6/2013 | Candy | |
| 2014/0232408 A1* | 8/2014 | Candy | G01V 3/104 324/329 |

OTHER PUBLICATIONS

International Preliminary Report on Patentability received for PCT Patent Application No. PCT/US2018/038766, dated Jan. 2, 2020, 8 pages.
Communication pursuant to Rule 164(1) issued by the European Patent Office, dated Feb. 19, 2021, for European Patent Application No. 18820196.6; 12 pages.

* cited by examiner

MULTI-FREQUENCY METAL DETECTOR

RELATED APPLICATION

This application claims the benefit of US Provisional Application No. 62/524,234, filed Jun. 23, 2017, titled MULTI-FREQUENCY METAL DETECTOR, the entire disclosure of which is expressly incorporated by reference herein.

FIELD

The present disclosure relates to a metal detector capable of generating a variety of periodic transmit signals, including frequency selection and frequency weighting.

BACKGROUND AND SUMMARY

Induction metal detectors are generally classified as either continuous-time (CT) (or so-called frequency-domain—FD) types or discrete-time (DT) (or time-domain—TD) types. CT types have traditionally utilized a continuous wave (CW) transmitter and CT demodulation. In most cases a single frequency metal detector transmits a sinusoidal current and utilizes continuous-time synchronous demodulation. The demodulation is typically performed using an in-phase and a quadrature-phase channel, which results in the ability to determine the amplitude and phase of the received signal. Because all of the received signal waveform is demodulated all the time, strong signal responses due to ground minerals cannot be eliminated at the demodulators, and must be dealt with in post-demodulator signal processing.

In time-domain detectors, particularly pulse induction (PI) types, demodulation is typically performed only on a portion of the received signal using DT methods. The PI detector also uses a DT transmit waveform, whereby the transmitter produces a short pulse of current followed by a longer period of zero current. Ferrite ground minerals decay much faster than typical target eddy current responses, so by slightly delaying the demodulation sampling beyond the turn-off point of the transmitter the response due to ferrite minerals can be substantially eliminated at the demodulator.

Multiple frequency metal detectors have utilized a combination of these approaches. In most cases, however, the transmit signal is based on a simple digitally switched voltage applied to a coil. When a switched voltage is applied to an ideal coil the resulting current through the coil is described by:

$$i(t) = \frac{1}{L}\int v(t)dt$$

For a constant voltage, the current is a linear ramp. If the voltage is switched between two DC levels then the coil current becomes a triangular waveform. An example of this approach is found in the "CZ"-series metal detectors produced by Fisher Research Labs. In the CZ, a 5 kHz square-wave voltage drive is applied to a transmit coil to produce a triangle wave current. A triangle wave is rich in odd-order harmonics; that is, it consists of a fundamental, a third harmonic, a fifth harmonic, etc. The resulting received signal is band pass-filtered at both the 5 kHz fundamental and the 15 kHz third harmonic; each frequency is then demodulated using CT quadrature demodulators. Because the coil current is a triangle wave, the fundamental signal strength at 5 kHz is nine times greater than the harmonic signal strength at 15 kHz.

A similar approach is found in the "DFX" metal detector produced by White's Electronics. Instead of a simple square wave drive, a multi-period voltage drive creates a complex multi-ramp waveform, the intent of which is to more evenly balance the signal strengths produced at the low frequency (3 kHz) and the high frequency (15 kHz). The receiver still uses FD processing, whereby each frequency is band-pass filtered and demodulated using CT quadrature demodulators.

With both the CZ and the DFX both frequencies are transmitted concurrently and the receiver continuously demodulates both frequencies concurrently. These will be referred to as concurrent multi-frequency (CMF) designs. In both cases the transmit current waveform is a series of ramps, whereby the "frequencies" referred to in a "multi-frequency" metal detector consist of fundamental and harmonic energies of the signal. That is, the transmit signal "frequencies" are not pure sinusoidal frequencies, but pure sinusoidal frequencies can be extracted from the signal through the use of band pass filtering. Once a substantially sinusoidal frequency has been extracted, it can be demodulated and processed in essentially the same way as a single-frequency sinusoidal metal detector would do.

An alternative approach is found in the U.S. Pat. Nos. 5,537,041 and 5,576,624 which have been realized in multiple products (e.g. "Sovereign") produced by Minelab Electronics. This method utilizes two distinct temporally-separated square wave frequencies to produce a single-cycle triangle wave current at 3.125 kHz, followed by 8 cycles of triangle wave current at 25 kHz. The received signal is temporally demodulated by separate low-frequency and high-frequency demodulators, but are done with DT quadrature demodulators. Because the low and high frequencies are sequentially transmitted and sequentially processed in the receiver, this method will be referred to as sequential multi-frequency (SMF). Another example is provided in U.S. Pat. No. 8,063,777.

Again, the transmit current waveform is a series of triangle waves, not sinusoids. Each triangle wave "frequency" consists of a fundamental frequency and its odd harmonics. Because SMF doesn't easily lend itself to CT filtering and demodulation, it is normally processed using DT methods. As such, the demodulators of a given frequency channel are operated at the overall frequency of a particular triangle wave portion, which happens to also be its fundamental frequency.

Although SMF is most easily realized with a simple digital voltage driver that produces ramps or triangle waveforms, it can also be realized by use of sinusoidal currents. U.S. Pat. Nos. 5,642,050 and 5,654,638 describe a multi-frequency approach in which the transmit coil is resonated at multiple frequencies by switching in multiple resonant capacitors. Each frequency is then demodulated using a CT demodulator. The transition between frequencies is difficult and limits the practicality of this approach.

There are particular advantages of SMF over CMF. In CMF the frequencies must be odd-order harmonically related; that is, a fundamental and its odd-order harmonics. In SMF, there is no harmonic requirement. In CMF, the received signal must be band-pass filtered before demodulation to ensure each channel is processing only the desired channel frequency. In SMF, frequencies are separated temporally so that channel filtering is not required. Frequency selection with SMF is easier, since each frequency is produced with a simple square wave voltage, alternating between two or more frequencies. With CMF, timing must be carefully calculated to produce the desired frequencies, which is made more difficult if particular relative signal strengths are desired. With SMF, it is a simple matter to produce 1, 2, 3, or even more frequencies, with each frequency being arbitrary. With CMF, selecting among 2 or more frequency sets requires predetermined transmit and demodulator waveforms that have little flexibility in terms of the desired frequencies.

SMF, as proposed in U.S. Pat. Nos. 5,537,041 and 5,576,624 and realized in Minelab products, has a significant shortcoming in that the transmitter switches between two fixed power supply voltages to produce both square wave drive frequencies. The result of this is that both frequencies have the same coil current slew rate, such that the high frequency peak current is one-eighth that of the low frequency. Minelab attempts to make up for the weaker high-frequency signal by repeating it eight times over, which theoretically equalizes the signal strengths. However, the practical result is that the high frequency transmit signal is still weaker, and products based on the technique are widely known to have weaker responses to low-conductive targets.

In an exemplary embodiment of the present disclosure, a method of transmitting a magnetic field in a metal detector is provided. The method comprising receiving, by a plurality of switching elements connecting a supply voltage across one or more transmit inductance coils, one or more transmit clock signals; and in response to receiving the one or more transmit clock signals, driving current to the one or more transmit inductance coils by enabling the one or more of the plurality of switching elements to provide the supply voltage across the one or more transmit inductance coils causing a plurality of repeating sequences of currents to be applied through the one or more transmit inductance coils. Each of the repeating sequences of currents is associated with a frequency and provides half-slopes of current to the one or more transmit inductance coils. The half-slopes of current comprise a substantially linear positive-sloped half-slope of current and a substantially equal and linear negative-sloped half-slope of current.

In an example thereof, the method further comprising dispersing a frequency associated with a first repeating sequence of current of the plurality of repeating sequences of current among other frequencies associated with other repeating sequences of currents of the plurality of repeating sequences of current.

In another example thereof, the plurality of half-slopes of current of a repeating sequence of current associated with a given frequency are sequential.

In yet another example thereof, the method further comprising selecting the number of plurality of repeating sequences of currents by a user.

In still another example thereof, the method further comprising selecting the frequency associated with each of the repeating sequences of currents by a user.

In a further example thereof, the method further comprising automatically selecting the frequencies in response to a preferred operating mode.

In yet a further example thereof, the method further comprising automatically selecting the frequencies in response to detecting operating conditions.

In still a further example, the method further comprising shifting all frequencies associated with the plurality of repeating sequences of current by a proportional amount, the proportional amount being less than 1%, to minimize interferers. In a variation thereof, the method further comprising selecting a frequency shift by a user. In another variation thereof, the method further comprising selecting a frequency shift by a detector in response to interference levels determined by a receiver circuit.

In yet sill a further example, the method further comprising independently shifting each frequency of the plurality of repeating sequences of current by an amount, the amount being less than 1%, to minimize interferers. In a variation thereof, the method further comprising selecting a frequency shift by a user. In another variation thereof, the method further comprising selecting a frequency shift by a detector in response to interference levels determined by a receiver circuit.

In another example thereof, the method further comprising balancing signal strengths of the plurality of frequencies associated with the plurality of repeating sequences of current such that their signal strengths as measured in a spectral measurement are approximately equal.

In a further example of thereof, the method further comprising intentionally unbalancing strengths of the plurality of frequencies associated with the plurality of repeating sequences of current to provide more signal strength to a more desired frequency than another. In a variation thereof, the method further comprising selecting relative signal strengths of the plurality of frequencies by the user. In another variation thereof, the method further comprising automatically controlling relative signal strengths of the plurality of frequencies by the metal detector. In still another variation thereof, the method further comprising determining the relative signal strengths of the plurality of frequencies based on ground conditions.

In another yet example thereof, the supply voltage is a bipolar supply voltage.

In still another example thereof, the supply voltage is a unipolar supply voltage.

In yet another example thereof, the supply voltage includes an appropriate capacitor for power recycling.

In still yet another example thereof, residual non-linearities of the half-slopes of current of a given frequency associated with a first repeating sequence of current of the plurality of repeating sequences of current are compensated by variations in the corresponding power supply.

In a further yet example thereof, the method further comprising measuring peak current levels of driven current to the one or more transmit inductance coils, in which a measured peak current level is used to adjust a corresponding power supply voltage. In a variation thereof, the method further comprising adjusting the corresponding power supply voltage to compensate for coil manufacturing variations. In another variation thereof, the method further comprising adjusting the corresponding power supply voltage to compensate for ground mineralization. In a further example thereof, the plurality of switching elements include one or more high-side switching elements and one or more low-side switching elements. In a variation thereof, the low-side switching elements include NMOS devices. In another variation thereof, the low-side switching elements are driven by logic gates whose inputs are high-side clock signals of the one or more transmit clock signals. In still another variation thereof, the high-side switching elements include PMOS devices. In yet another variation thereof, the high-side switching elements include high-voltage reverse-conduction blocking elements. In a further variation thereof, a high-side switching element of the high-side switching elements is comprised of back-to-back PMOS devices. In a yet further variation, the one or more high-side switching elements is comprised of back-to-back NMOS devices.

In still another example thereof, the method further comprising a receiver circuit connected to one or more receive inductance coils, in which the one or more receive inductance coils produces one or more voltages in response to a received magnetic field signal, wherein the receiver circuit receives a receive demodulator clock signal to synchronously demodulate the one or more voltages to produce one or more demodulated outputs. In a variation thereof, a randomized timing jitter is applied to a transmit clock signal, and a coherent jitter is applied to the appropriate receiver demodulator clock signal. In another variation thereof, a frequency offset is applied to a transmit clock signal, and a coherent frequency offset is applied to the appropriate receiver demodulator clock signal. In a further variation thereof, the jitter or offset is applied to all frequencies. In still another variation thereof, the jitter or offset is applied to select frequencies.

In another exemplary embodiment of the present disclosure, a method of transmitting a plurality of frequencies with differing slew rates is provided. The method comprising in response to receiving a first clock, enabling a first switch and a second switch to provide a first positive voltage across a coil; in response to receiving a second clock, enabling a third switch and a fourth switch to provide a first negative voltage across the coil; in response to receiving a third clock, enabling a fifth switch and the second switch to provide a second positive voltage across the coil; and in response to receiving a fourth clock, enabling a sixth switch and the fourth switch to provide a second negative voltage across the coil.

In an example thereof, the second positive voltage is greater than the first positive voltage.

In yet another exemplary embodiment of the present disclosure, a method of transmitting a plurality of frequencies with differing slew rates is provided. The method comprising in response to receiving a first clock, enabling a first switch and a second switch to provide a first voltage across a coil in a first direction; in response to receiving a second clock, enabling a third switch and a fourth switch to provide the first voltage across the coil in a second direction; in response to receiving a third clock, enabling a fifth switch and the second switch to provide a second voltage across the coil in the first direction; and in response to receiving a fourth clock, enabling a sixth switch and the fourth switch to provide the second voltage across the coil in the second direction.

In still another exemplary embodiment of the present disclosure, a method of transmitting a plurality of frequencies with differing slew rates is provided. The method comprising in response to receiving a first clock, enabling a first switch and a second switch to provide a positive low voltage across a coil; in response to receiving a second clock, enabling a third switch and a fourth switch to provide a negative low voltage across the coil; in response to receiving a third clock, enabling a fifth switch and a sixth switch to provide a positive high voltage across the coil; and in response to receiving a fourth clock, enabling a seventh switch and an eighth switch to provide a negative high voltage across the coil.

In still yet another exemplary embodiment of the present disclosure, a transmit circuit for transmitting at least a low frequency and a high frequency is provided. The transmit circuit comprising a coil with a first connection point and a second connection point, a low frequency switch circuit, and a high frequency switch circuit. The low frequency switch circuit comprising a first low frequency switch comprising a first low frequency input connection, a first low frequency output connection, and a first low frequency enable connection. The first low frequency input connection is electrically connected to a first low frequency voltage source. The first low frequency output connection is electrically connected to the first connection point of the coil. The first low frequency enable connection is electrically connected to a first low frequency clock source. The low frequency switch circuit further comprising a second low frequency switch comprising a second low frequency input connection, a second low frequency output connection, and a second low frequency enable connection. The second low frequency input connection is electrically connected to the first low frequency voltage source. The second low frequency output connection is electrically connected to the second connection point of the coil. The second low frequency enable connection is electrically connected to a second low frequency clock source. The low frequency switch circuit further comprising a third low frequency switch comprising a third low frequency input connection, a third low frequency output connection, and a third low frequency enable connection. The third low frequency input connection is electrically connected to a second low frequency voltage source. The third low frequency output connection is electrically connected to the first connection point of the coil. The third low frequency enable connection is electrically connected to the second low frequency clock source. The low frequency switch circuit further comprising a fourth low frequency switch comprising a fourth low frequency input connection, a fourth low frequency output connection, and a fourth low frequency enable connection. The fourth low frequency input connection is electrically connected to the second low frequency voltage source. The fourth low frequency output connection is electrically connected to the second connection point of the coil. The fourth low frequency enable connection is electrically connected to the first low frequency clock source. The high frequency switch circuit comprising a first high frequency switch comprising a first high frequency input connection, a first high frequency output connection, and a first high frequency enable connection. The first high frequency input connection is electrically connected to a first high frequency voltage source. The first high frequency output connection is electrically connected to the first connection point of the coil. The first high frequency enable connection is electrically connected to a first high frequency clock source. The high frequency switch circuit further comprising a second high frequency switch comprising a second high frequency input connection, a second high frequency output connection, and a second high frequency enable connection. The second high frequency input connection is electrically connected to the first high frequency voltage source. The second high frequency output connection is electrically connected to the second connection point of the coil. The second high frequency enable connection is electrically connected to a second high frequency clock source. The high frequency switch circuit further comprising a third high frequency switch comprising a third high frequency input connection, a third high frequency output connection, and a third high frequency enable connection. The third high frequency input connection is electrically connected to a second high frequency voltage source. The third high frequency output connection is electrically connected to the first connection point of the coil. The third high frequency enable connection is electrically connected to the second high frequency clock source. The high frequency switch circuit further comprising a fourth high frequency switch comprising a fourth high frequency input connection, a fourth high frequency output connection, and a fourth high frequency enable connection. The fourth high frequency input connection is electrically connected to the second high frequency voltage source. The fourth high frequency output connection is electrically connected to the second connection point of the coil. The fourth high frequency enable connection is electrically connected to the first high frequency clock source.

In a further exemplary embodiment of the present disclosure, a transmit circuit for transmitting at least a low frequency and a high frequency is provided. The transmit circuit comprising a coil with a first connection point and a second connection point; a low frequency switch circuit, a high frequency switching circuit, and a common switch circuit. The low frequency switch circuit comprising a first low frequency switch comprising a first low frequency input connection, a first low frequency output connection, and a first low frequency enable connection. The first low frequency input connection is electrically connected to a first low frequency voltage source. The first low frequency output connection is electrically connected to the first connection point of the coil. The first low frequency enable connection is electrically connected to a first low frequency clock source. The low frequency switch circuit further comprising a second low frequency switch comprising a second low frequency input connection, a second low frequency output connection, and a second low frequency enable connection. The second low frequency input connection is electrically connected to the first low frequency voltage source. The second low frequency output connection is electrically connected to the second connection point of the coil. The second low frequency enable connection is electrically connected to a second low frequency clock source. The high frequency switch circuit comprising a first high frequency switch comprising a first high frequency input connection, a first high frequency output connection, and a first high frequency enable connection. The first high frequency input connection is electrically connected to a first high frequency voltage source. The first high frequency output connection is electrically connected to the first connection point of the coil. The first high frequency enable connection is electrically connected to a first high frequency clock source. The high frequency switch circuit further comprising a second high frequency switch comprising a second high frequency input connection, a second high frequency output connection, and a second high frequency enable connection. The second high frequency input connection is electrically connected to the first high frequency voltage source. The second high frequency output connection is electrically connected to the second connection point of the coil. The second high frequency enable connection is electrically connected to a second high frequency clock source. The common switch circuit comprising a first common switch comprising a first common input connection, a first common output connection, and a first common enable connection. The first common input connection is electrically connected to a first common voltage source. The first common output connection is electrically connected to the first connection point of the coil. The first common enable connection is electrically connected to the second low frequency clock source and the second high frequency clock source. The common switch circuit further comprising a second common switch comprising a second common input connection, a second common output connection, and a second common enable connection. The second common input connection is electrically connected to the first common voltage source. The second common output connection is electrically connected to the second connection point of the coil. The second common enable connection is electrically connected to the first low frequency clock source and the first high frequency clock source.

In an example thereof, the first common voltage source provides an electrical connection to ground.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The foregoing aspects and additional features of the present system and method will become more readily appreciated and become better understood by reference to the following detailed description when taken in conjunction with the accompanying drawings.

Figure 1:
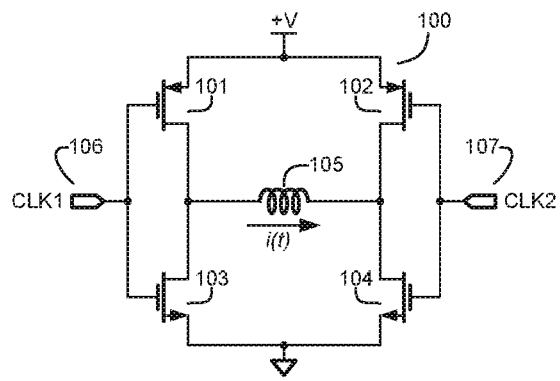
FIG. 1 illustrates a conventional H-bridge transmitter.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

DETAILED DESCRIPTION OF THE DRAWINGS

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It is understood that no limitation of the scope of the invention is thereby intended. The invention includes any alterations and further modifications in the illustrated devices and described methods and further applications of the principles of the invention which would normally occur to one skilled in the art to which the invention relates.

Figure 2:
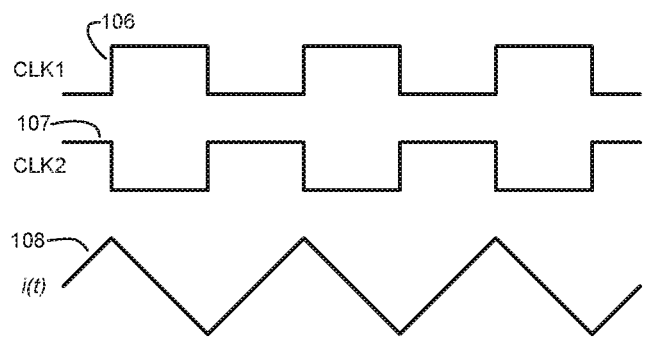
FIG. 2 illustrates a conventional single-period transmit waveform.

FIG. 1 shows a basic H-bridge driver 100 using MOSFETs 101, 102, 103, and 104 to drive current i(t) through search coil inductor 105. With appropriate clock signals 106 and 107 applied it is possible to generate a continuous coil current waveform 108 as shown in FIG. 2. This represents a typical way in which to produce a multi-frequency transmit waveform. Although a full H-bridge is shown, and although MOSFET switches are shown, the driver could be implemented in a half-bridge circuit, and could utilize a variety of switching devices. The transmit current waveform 108 is indicative of that used in the Fisher CZ-series metal detectors.

Figure 3:
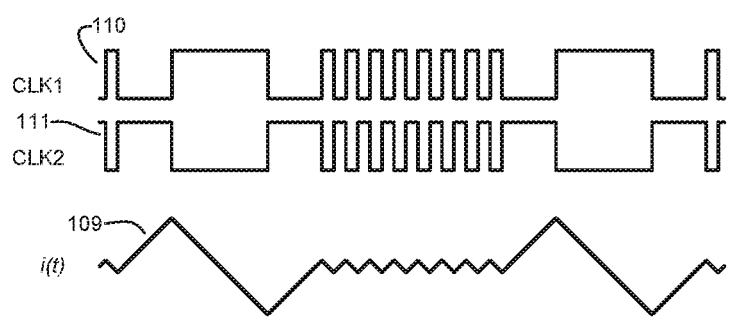
FIG. 3 illustrates a conventional two-period transmit waveform.

It is possible to vary the clock rate to produce different "frequencies." FIG. 3 shows a current waveform 109 consisting of a low frequency cycle followed by several high frequency cycles. The transmit drive voltages required to produce this signal are CLK1 (110) and CLK2 (111). This is the same as shown in U.S. Pat. No. 5,537,041 and utilized by Minelab in their multifrequency metal detectors such as the Sovereign and CTX3030. Although each "frequency" portion is a triangle wave rich in harmonic frequency content, the received signal is discrete-time demodulated and processed at the fundamental frequency of the corresponding triangle wave. Therefore, this would be regarded as a 2-frequency metal detector.

With only a single supply voltage the higher frequency triangle wave has the same slew rate as the lower frequency wave and so it has a proportionally lower peak current, requiring proportionally more timing cycles to produce a sufficiently strong (integrated) target response. Even so, the transmitted magnetic field, the target eddy currents, and the received signal strength from the target all scale with the peak coil current, and repetition only partially compensates for the weaker signal.

Furthermore, because the high-frequency component has the same slew rate as the low-frequency component, the target responses will essentially be identical, albeit truncated. That is, target eddy response is dependent on dB/dt, and for both low and high frequencies dB/dt is the same. The primary difference is in the duration of the current slopes, whereby the longer duration of the low frequency slope allows more time for high-conductor targets to fully respond.

Figure 4:
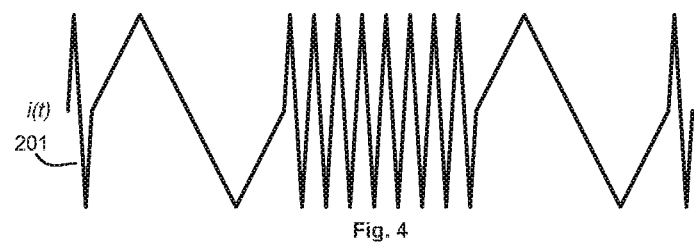
FIG. 4 illustrates a two-period scaled transmit waveform.

The shortcomings can be solved by boosting the amplitude of the high frequency signal and achieving both a higher slew rate and a higher peak current. The waveform 201 in FIG. 4 is similar to the waveform 109 in FIG. 3 but with the peak currents equalized. It should be noted that complete equalization of frequency peak currents is not necessary but for the purposes of discussion it will be assumed.

Figure 5:
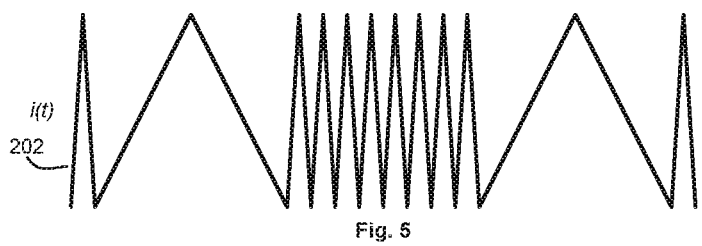
FIG. 5 illustrates an improved two-period scaled transmit waveform.

The waveform 201 in FIG. 4 is not preferable because the frequency change occurs in the middle of a current slope. It is preferable to change the slope at the peaks of the current slopes, where a slope polarity change is already occurring. FIG. 5 shows a 2-frequency example waveform 202 where the slope changes occur at the peaks.

Figure 6:
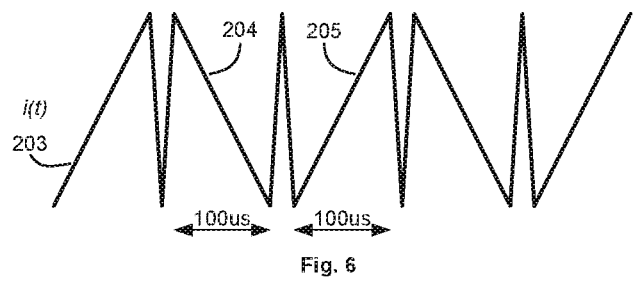
FIG. 6 illustrates a dispersed two-period scaled transmit waveform.

In some situations it is furthermore advantageous to present the transmit waveform as an odd-symmetric waveform, as in waveform 203 in FIG. 6. Previously, a "frequency" was considered to be the fundamental frequency of a given triangle wave portion of the transmit waveform. Waveform 203 shows that "frequencies" can be dispersed as individual slopes. In this case, a "frequency" would correspond to twice the period of an individual slope. That is, if negative half-slope 204 has a duration of 100 microseconds (us), then when combined with a corresponding positive half-slope 205 with the same duration of 100 us it would effect a complete cycle of a triangle wave with a period of 200 us, which corresponds to a frequency of 5 kHz.

Figure 7:
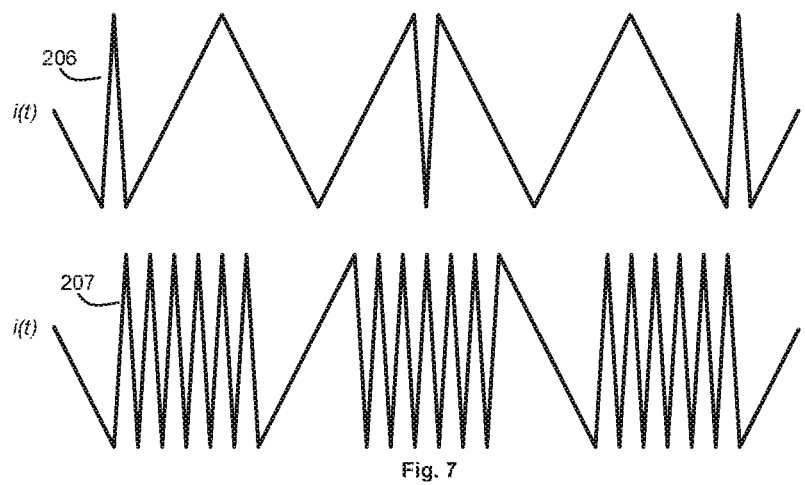
FIG. 7 illustrates weighted two-period scaled transmit waveforms.

If the high-frequency current peaks are now substantially equal to the low-frequency current peaks per waveform 203, there is more flexibility in choosing the relative number of repetitions. This could be done to balance the transmit signal strengths at the two frequencies as measured, for example, in a frequency spectral plot of the transmit signal. But it may be advantageous to boost one frequency signal strength over the other for a particular application or environmental conditions. FIG. 7 shows two such examples; waveform 206 shows a relatively higher contribution of the low frequency signal, and waveform 207 shows a relatively higher contribution of the high frequency signal. Selecting the contribution level might be controlled by the user, or it might be automatically controlled in response to e.g. ground conditions.

Figure 8:
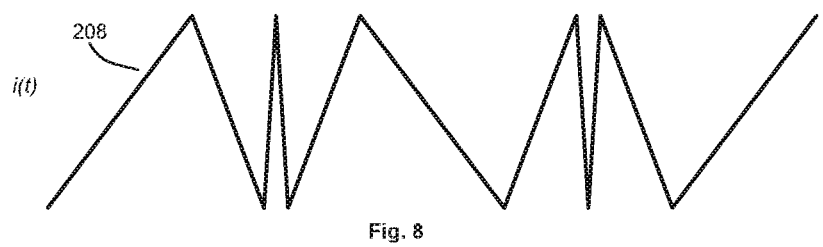
FIG. 8 illustrates a three-period scaled transmit waveform.

The technique discussed extends to any number of frequencies, typically 1 to 4 in a hand-held metal detector and possibly more in a geophysics application. Waveform 208 in FIG. 8 shows an example 3-frequency waveform.

Figure 9:
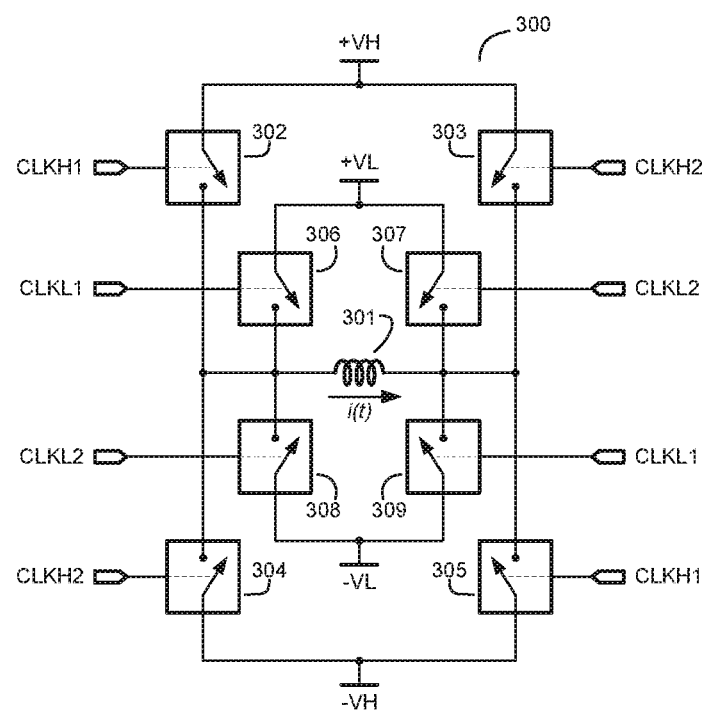
FIG. 9 illustrates a two-level H-bridge transmitter.

The transmit driver 100 in FIG. 1 is sufficient to produce a transmit waveform with a single slew rate, such as waveforms 108 and 109. Multiple slew rates require multiple voltage drives, making the transmit circuitry more complex. FIG. 9 shows an exemplary transmit circuit 300 for transmitting two frequencies at two slew rates. For a low slew rate signal (low frequency), low voltages +VL and −VL are applied to coil 301 with switches 306 and 309 (controlled by clock CLKL1) for a rising (positive) current polarity, and with switches 307 and 308 (controlled by clock CLKL2) for a falling (negative) current polarity. For a high slew rate signal (high frequency), high voltages +VH and −VH are applied to coil 301 with switches 302 and 305 (controlled by clock CLKH1) for a rising (positive) current polarity, and with switches 303 and 304 (controlled by clock CLKH2) for a falling (negative) current polarity.

The switches 302-309 may be implemented in a variety of ways, including discrete devices like bipolar transistors or MOSFETs, integrated switching devices, or any combinations thereof. Power supply voltages may also be implemented in a variety of ways, but ideally should be substantially constant in value. Supply voltage values would be optimally selected to produce consistent peak coil currents for each frequency slew rate. That is, if the high frequency slew rate is four times the slew rate of the low frequency, the high voltages (+VH, −VH) would be four times higher than the low voltages (+VL, −VL). This is not an absolute requirement, and in reality the voltages could be set to other non-optimal values.

Figure 10:
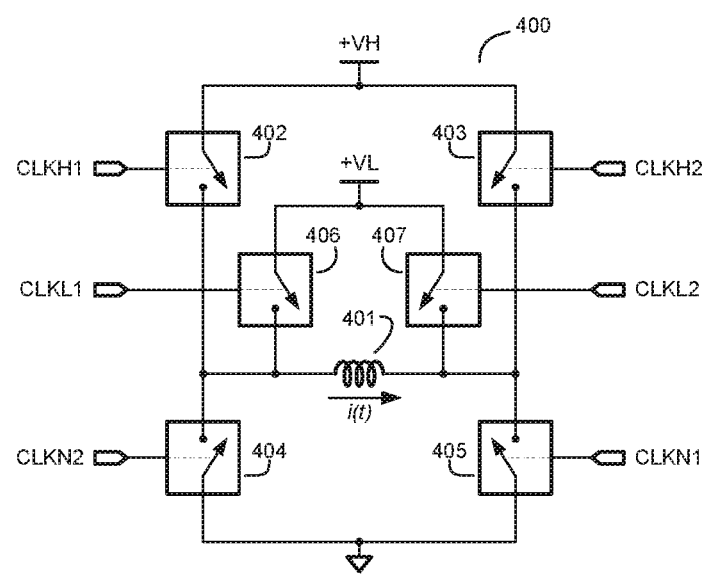
FIG. 10 illustrates an improved two-level H-bridge transmitter.

It is not necessary to employ bipolar supply voltages. FIG. 10 shows a simplified circuit 400 in which the −VL and −VH supplies are simply grounded. Circuit 400 performs the same operational function as circuit 300 but with fewer switches.

Figure 11:
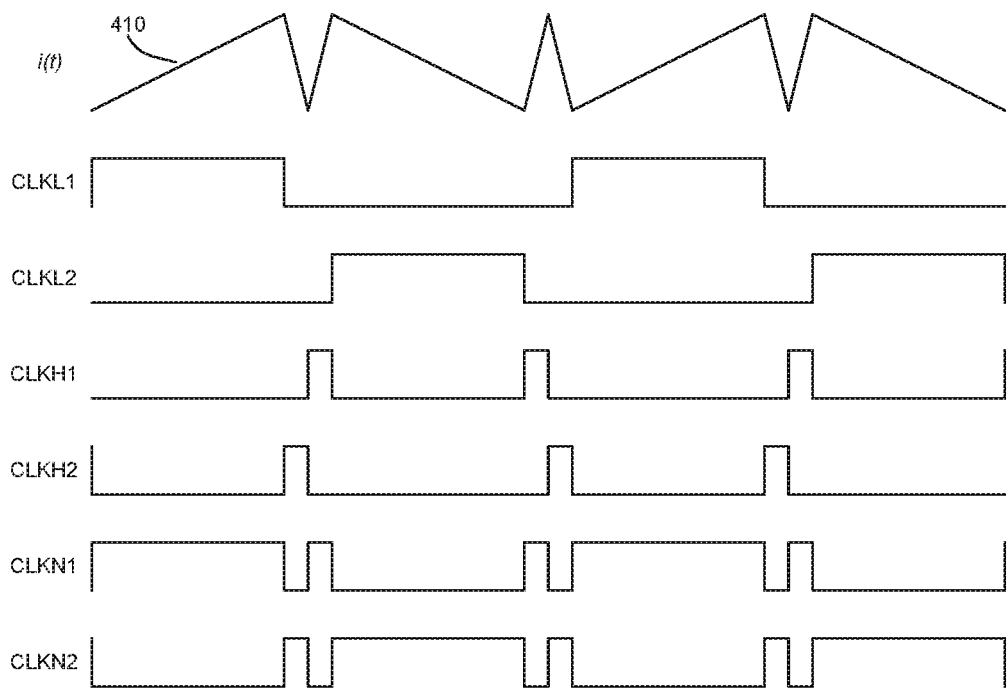
FIG. 11 illustrates coil current and clocking waveforms for an improved two-level H-bridge transmitter.

Furthermore, in circuit 300, low-side switches 304, 308 and 305, 309 are combined into low-side switches 404 and 405, respectively, in circuit 400. This slightly simplifies the circuit at the expense of slightly more complex timing, although the timing signals for the low-side switches 404 and 405 can be derived by logically combining the clocks for the high-side switches. FIG. 11 shows an example coil current waveform 410 and the clocking signals required to achieve it. Although the implementation discussed so far is described in terms of two frequencies, it can be expanded to more frequencies with additional high-side switches and power supply voltages. A particular example would be the use of 5V, 20V, and 80V to achieve 4.5 kHz, 18 kHz, and 72 kHz respectively. While additional frequencies require more high-side switches and power supply voltages, they do not require additional low-side switches; devices 404 and 405 will suffice for any number of frequencies.

In the aforementioned example, the selection of a 1 mH transmit coil inductance would result in a peak-to-peak current of about 556 mA. Regardless of the use of bipolar or unipolar supply voltages, it is not necessary for each power supply to have a current capacity equal to the peak dynamic current. Because the polarity of the coil current changes direction at each transition point (whether or not that transition point also produces a frequency change), coil current can be efficiently recycled by connecting an appropriate tank capacitor across each of the power supply voltages. At the instance beyond the transition point, the collapsing magnetic field provides a charging current into the capacitor, up to the point where the coil current falls to zero. Beyond that point, the same capacitor then provides current back to the coil for the remainder of the current slope, from zero current to the peak current at the next transition point. Ohmic losses in the coil, switches, and capacitor prevent complete power recycling, but this method provides for a highly efficient means for a large number of frequencies over a very wide range of frequencies. It is important to select a capacitor value that minimizes ramp non-linearities.

Figure 12:
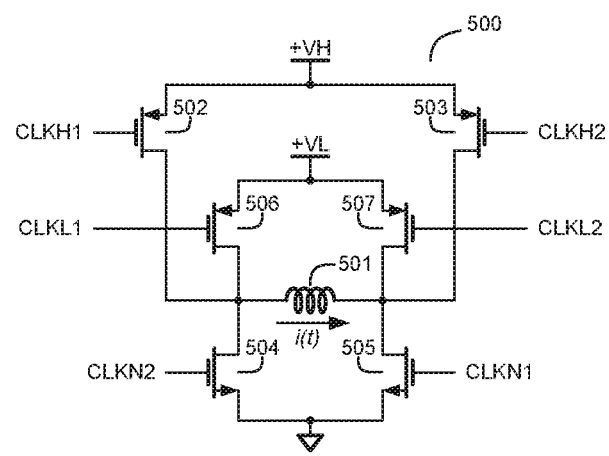
FIG. 12 illustrates an example of a two-level H-bridge transmitter.

Although there are many ways to implement the switches in circuit 400, a preferred way is with MOSFET devices. FIG. 12 shows an example circuit 500 using NMOS transistors for the low-side switches 504, 505 and PMOS transistors for the high-side switches 502, 503, 506, 507. Those skilled in the arts will recognize that such an arrangement has a flaw in that the intrinsic body diodes of PMOS devices 506, 507 will get turned on by the application of +VH when PMOS devices 502, 503 are switched on, respectively. There are again many ways in which to mitigate this problem, including the use of high-voltage selectable blocking devices like inverted NMOS transistors, or by using high-side switches implemented with back-to-back PMOS or NMOS devices. There are many solutions to this issue, and these solutions are anticipated and within the scope of the present disclosure.

Figure 13:
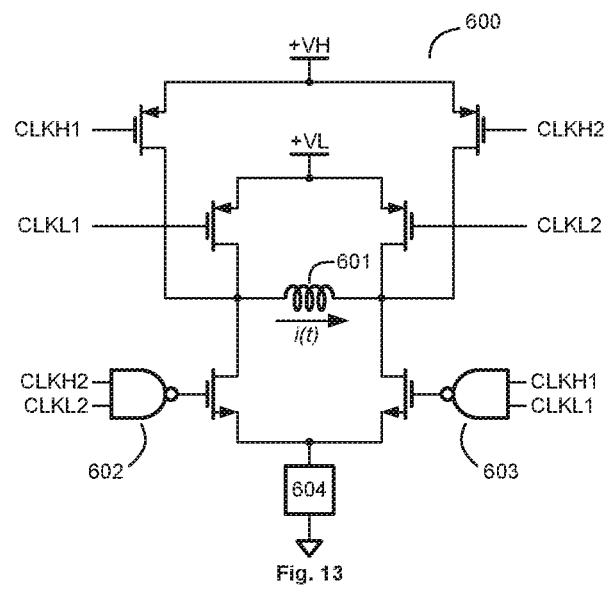
FIG. 13 illustrates a two-level H-bridge transmitter with derived low-side clocks and coil current measurement.

The required signals for CLKN1 and CLKN2 can be derived using logic gates applied to the high-side clock signals. FIG. 13 shows NAND gates 601, 602 creating the required low-side clocks. This simplifies clocking requirements to just the high-side switches. It is possible to invert the entire circuitry so that the multiple voltages and multiple switches are on the low side, and the common switches are on the high side.

Circuit 600 in FIG. 13 also includes current measurement element 603 which may be used to monitor the peak current amplitudes of the various frequencies and make adjustments to the power supply voltages. This can be useful in compensating for slight manufacturing variations in the inductance of the transmit coil, or to compensate for variable ground conditions.

Metal detectors which employ an inductive coil for receiving target responses are also prone to receiving EMI, particularly EMI from a 50 Hz or 60 Hz electrical mains. A common way of minimizing the effect of mains interference is to carefully select a transmit frequency which is an exact multiple of the mains frequency, such that the signal from the mains EMI demodulates to a DC offset in the receiver demodulators. This offset is then filtered out. Because of the difficulty of exactly hitting a multiple of the mains frequency, many detectors instead choose a multiple-and-a-half of the mains frequency. This places the demodulated EMI signal at an offset of half the mains frequency (i.e., 30 Hz for a 60 Hz mains) away from the target's synchronously demodulated response, and is filtered out using low-pass filters.

A shortcoming of this method is that, while the mains frequency is very accurate over a long period of time, it can vary a fraction of a percent over a matter of hours. This can be enough to place its harmonic-and-a-half multiple inside the bandwidth of the aforementioned low-pass filter and cause interference. Indeed, it is not uncommon for a metal detectorist to have little interference one day and significant interference the next, all at the same location.

Many metal detectors offer a "frequency offset" control whereby, either manually or automatically, the transmit frequency is very slightly shifted, often by fractions of a percent, to move a demodulated interferer out-of-band. The amount of frequency shift is not sufficient to cause a meaningful difference in target responses. This technique can be effective in minimizing a particular interferer, but may be completely ineffective when multiple interferers are present. In previous multi-frequency metal detectors, including CMF and SMF, the frequency offset was applied proportionally to all frequencies. That is, a 3 kHz+15 kHz detector might be shifted by +1% to produce 3.03 kHz+ 15.15 kHz. Maintaining proportional frequency offsets is required in CMF, but not necessarily in SMF.

A preferred solution is to apply a random timing jitter to the transmit waveform, and to apply the same (coherent) jitter to the receiver demodulators. This approach does not work when using CT demodulators as either the in-phase or quadrature-phase demodulator signal (or both) will be corrupted. However, the method presented here, with the use of DT receiver demodulators, allows the use of intentional coherent jitter to randomize and reduce EMI effects. It should be noted that while the application of jitter slightly alters the transmitted frequencies in a strict sense, in a practical sense it is not enough to alter the target responses in a meaningful way, and so the transmitted "frequencies" are considered to be effectively unaltered.

Because the frequencies in SMF are independent of each other, the frequency offset—whether a fixed offset or a random jitter—applied to each frequency may also be independent. It is only important that the receiver demodulators which correspond to the shifted frequency also be shifted by an appropriate amount.

Figure 14:
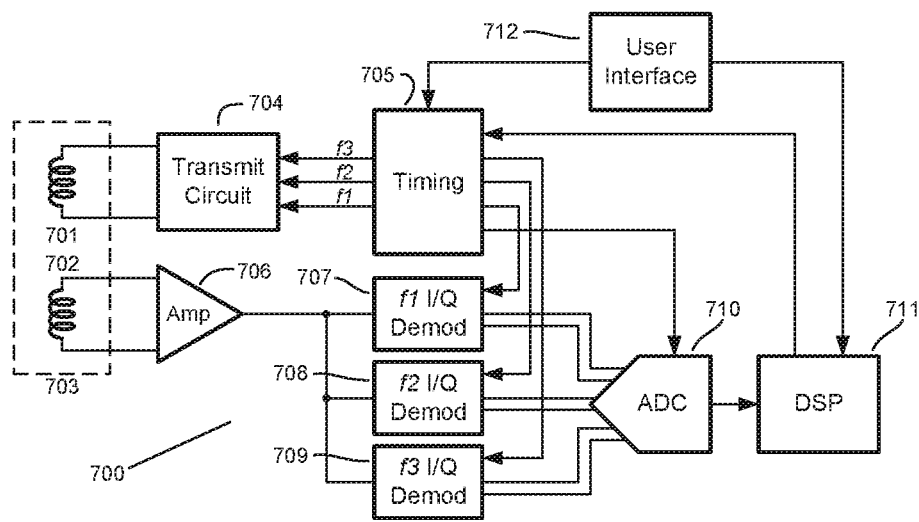
FIG. 14 illustrates a block diagram of a metal detector system utilizing described invention.

FIG. 14 shows an application of the invention to a metal detection system 700, in this example using three frequencies. Transmit circuit 704 creates a three frequency transmit waveform current applied to transmit coil 701, in response to the clock signals generated by timing block 705. Receive coil 702 receives target responses as magnetic anomalies and converts the magnetic responses to either a voltage or a current signal; amplifier 706 amplifies the received signal and applies it to demodulators 707, 708, and 709.

Each demodulator corresponds to one of the three frequencies and receives timing signals from timing block 705 that correspond to the proper frequency of concern. While a given demodulator block is labeled as an "I/Q demod" it may, in fact, consist of 1, 2, or more individual demodulators. It is also possible to create mixed-frequency demodulators where, for example, the reactive components from 2 or more frequencies are demodulated together to create a composite reactive signal.

The various demodulator signals may or may not be further processed in the analog domain, then digitized by ADC 710 and processed with digital signal processing block 711 to create audible and visual responses for the operator. DSP block 711 can also modify operating parameters of timing block 705 in response to the analysis of the demodulated signals for e.g. ground conditions.

User interface 712 may be incorporated to allow the user to manually control various aspects of the system as described, such as the selection of the operating frequencies or the relative weightings thereof. The user interface may be implemented using a traditional method such as an integrated keypad and LCD, or via a linked computer, or via a remote unit such as a wired or wireless device, including a cell phone app.

In one example, a method of transmitting a magnetic field in a metal detector, comprises: receiving, by a plurality of switching elements connecting a supply voltage across one or more transmit inductance coils, one or more transmit clock signals; in response to receiving the one or more transmit clock signals, driving current to the one or more transmit inductance coils by enabling the one or more of the plurality of switching elements to provide the supply voltage across the one or more transmit inductance coils causing a plurality of repeating sequences of currents to be applied through the one or more transmit inductance coils, wherein each of the repeating sequences of currents is associated with a frequency and provides half-slopes of current to the one or more transmit inductance coils, wherein the half-slopes of current comprise a substantially linear positive-sloped half-slope of current and a substantially equal and linear negative-sloped half-slope of current.

In one example, the method comprises dispersing a frequency associated with a first repeating sequence of current of the plurality of repeating sequences of current among other frequencies associated with other repeating sequences of currents of the plurality of repeating sequences of current. In another example, the plurality of half-slopes of current of a repeating sequence of current associated with a given frequency are sequential.

In one example the method includes selecting the number of plurality of repeating sequences of currents by a user. In another example the method includes selecting the frequency associated with each of the repeating sequences of currents by a user. In yet another example the method includes automatically selecting the frequencies in response to a preferred operating mode. In one example the method includes automatically selecting the frequencies in response to detecting operating conditions.

In one example, the method includes shifting all frequencies associated with the plurality of repeating sequences of current by a proportional amount, the proportional amount being less than 1%, to minimize interferers. In one example, the method includes independently shifting each frequency of the plurality of repeating sequences of current by an amount, the amount being less than 1%, to minimize interferers. In one example, the method includes selecting a frequency shift by a user. In one example, the method includes selecting a frequency shift by a detector in response to interference levels determined by a receiver circuit.

In one example the method includes balancing signal strengths of the plurality of frequencies associated with the plurality of repeating sequences of current such that their signal strengths as measured in a spectral measurement are approximately equal.

In one example the method includes intentionally unbalancing strengths of the plurality of frequencies associated with the plurality of repeating sequences of current to provide more signal strength to a more desired frequency than another. For example, the method can include selecting relative signal strengths of the plurality of frequencies by the user.

In another example, the method can include automatically controlling relative signal strengths of the plurality of frequencies by the metal detector. In yet another example, the method includes determining the relative signal strengths of the plurality of frequencies based on ground conditions.

In one example, the supply voltage is a bipolar supply voltage. In another example, the supply voltage is a unipolar supply voltage. In yet another example, the supply voltage includes an appropriate capacitor for power recycling.

In one example, residual non-linearities of the half-slopes of current of a given frequency associated with a first repeating sequence of current of the plurality of repeating sequences of current are compensated by variations in the corresponding power supply.

One example includes measuring peak current levels of driven current to the one or more transmit inductance coils, in which a measured peak current level is used to adjust a corresponding power supply voltage. One example includes adjusting the corresponding power supply voltage to compensate for coil manufacturing variations. One example includes adjusting the corresponding power supply voltage to compensate for ground mineralization.

In one example, the plurality of switching elements include one or more high-side switching elements and one or more low-side switching elements. In one example, the low-side switching elements include NMOS devices. In one example, the low-side switching elements are driven by logic gates whose inputs are high-side clock signals of the one or more transmit clock signals. In one example, the high-side switching elements include PMOS devices. In one example, the high-side switching elements include high-voltage reverse-conduction blocking elements. In one example, a high-side switching element of the high-side switching elements is comprised of back-to-back PMOS devices. In one example, the one or more high-side switching elements is comprised of back-to-back NMOS devices.

In one example, a receiver circuit is connected to one or more receive inductance coils, wherein the one or more receive inductance coils produces one or more voltages in response to a received magnetic field signal, wherein the receiver circuit receives a receive demodulator clock signal to synchronously demodulate the one or more voltages to produce one or more demodulated outputs.

In one example, a randomized timing jitter is applied to a transmit clock signal, and a coherent jitter is applied to the appropriate receiver demodulator clock signal. In one example, a frequency offset is applied to a transmit clock signal, and a coherent frequency offset is applied to the appropriate receiver demodulator clock signal. In one example, the jitter or offset is applied to all frequencies. In another example, the jitter or offset is applied to select frequencies.

In one example, a method of transmitting a plurality of frequencies with differing slew rates comprises: in response to receiving a first clock, enabling a first switch and a second switch to provide a first positive voltage across a coil; in response to receiving a second clock, enabling a third switch and a fourth switch to provide a first negative voltage across the coil; in response to receiving a third clock, enabling a fifth switch and the second switch to provide a second positive voltage across the coil; and in response to receiving a fourth clock, enabling a sixth switch and the fourth switch to provide a second negative voltage across the coil. In one example, the second positive voltage is greater than the first positive voltage. In one example, the absolute value of the second negative voltage is greater than the absolute value of the first negative voltage. In one example, the first positive voltage and the first negative voltage can be provided by a first voltage source, and the second positive voltage and the second negative voltage can be provided by a second voltage source.

In another example method of transmitting a plurality of frequencies with differing slew rates, the method comprises: in response to receiving a first clock, enabling a first switch and a second switch to provide a first voltage across a coil in a first direction; in response to receiving a second clock, enabling a third switch and a fourth switch to provide the first voltage across the coil in a second direction; in response to receiving a third clock, enabling a fifth switch and the second switch to provide a second voltage across the coil in the first direction; and response to receiving a fourth clock, enabling a sixth switch and the fourth switch to provide the second voltage across the coil in the second direction.

In yet another example method of transmitting a plurality of frequencies with differing slew rates, the method comprises: in response to receiving a first clock, enabling a first switch and a second switch to provide a positive low voltage across a coil; in response to receiving a second clock, enabling a third switch and a fourth switch to provide a negative low voltage across the coil; in response to receiving a third clock, enabling a fifth switch and a sixth switch to provide a positive high voltage across the coil; and in response to receiving a fourth clock, enabling a seventh switch and an eighth switch to provide a negative high voltage across the coil.

In one example transmit circuit for transmitting at least a low frequency and a high frequency, the transmit circuit comprises: a coil with a first connection point and a second connection point, and a low frequency switch circuit comprising a first low frequency switch comprising a first low frequency input connection, a first low frequency output connection, and a first low frequency enable connection wherein: the first low frequency input connection is electrically connected to a first low frequency voltage source; the first low frequency output connection is electrically connected to the first connection point of the coil; and the first low frequency enable connection is electrically connected to a first low frequency clock source.

The a low frequency switch circuit further includes a second low frequency switch comprising a second low frequency input connection, a second low frequency output connection, and a second low frequency enable connection wherein: the second low frequency input connection is electrically connected to the first low frequency voltage source; the second low frequency output connection is electrically connected to the second connection point of the coil; and the second low frequency enable connection is electrically connected to a second low frequency clock source.

The a low frequency switch circuit also includes a third low frequency switch comprising a third low frequency input connection, a third low frequency output connection, and a third low frequency enable connection, wherein: the third low frequency input connection is electrically connected to a second low frequency voltage source; the third low frequency output connection is electrically connected to the first connection point of the coil; and the third low frequency enable connection is electrically connected to the second low frequency clock source.

The low frequency switch circuit further includes a fourth low frequency switch comprising a fourth low frequency input connection, a fourth low frequency output connection, and a fourth low frequency enable connection, wherein: the fourth low frequency input connection is electrically connected to the second low frequency voltage source; the fourth low frequency output connection is electrically connected to the second connection point of the coil; and the fourth low frequency enable connection is electrically connected to the first low frequency clock source.

The example transmit circuit also includes a high frequency switch circuit comprising a first high frequency switch comprising a first high frequency input connection, a first high frequency output connection, and a first high frequency enable connection wherein: the first high frequency input connection is electrically connected to a first high frequency voltage source; the first high frequency output connection is electrically connected to the first connection point of the coil; and the first high frequency enable connection is electrically connected to a first high frequency clock source.

The high frequency switch circuit also includes a second high frequency switch comprising a second high frequency input connection, a second high frequency output connection, and a second high frequency enable connection wherein: the second high frequency input connection is electrically connected to the first high frequency voltage source; the second high frequency output connection is electrically connected to the second connection point of the coil; and the second high frequency enable connection is electrically connected to a second high frequency clock source.

The high frequency switch circuit further includes a third high frequency switch comprising a third high frequency input connection, a third high frequency output connection, and a third high frequency enable connection, wherein: the third high frequency input connection is electrically connected to a second high frequency voltage source; the third high frequency output connection is electrically connected to the first connection point of the coil; and the third high frequency enable connection is electrically connected to the second high frequency clock source.

The high frequency switch circuit also includes a fourth high frequency switch comprising a fourth high frequency input connection, a fourth high frequency output connection, and a fourth high frequency enable connection, wherein: the fourth high frequency input connection is electrically connected to the second high frequency voltage source; the fourth high frequency output connection is electrically connected to the second connection point of the coil; and the fourth high frequency enable connection is electrically connected to the first high frequency clock source.

In another example transmit circuit for transmitting at least a low frequency and a high frequency, the transmit circuit comprises a coil with a first connection point and a second connection point, and a low frequency switch circuit comprising a first low frequency switch comprising a first low frequency input connection, a first low frequency output connection, and a first low frequency enable connection wherein: the first low frequency input connection is electrically connected to a first low frequency voltage source; the first low frequency output connection is electrically connected to the first connection point of the coil; and the first low frequency enable connection is electrically connected to a first low frequency clock source.

The low frequency switch circuit also includes a second low frequency switch comprising a second low frequency input connection, a second low frequency output connection, and a second low frequency enable connection wherein: the second low frequency input connection is electrically connected to the first low frequency voltage source; the second low frequency output connection is electrically connected to the second connection point of the coil; and the second low frequency enable connection is electrically connected to a second low frequency clock source.

The transmit circuit further comprises a high frequency switch circuit comprising a first high frequency switch comprising a first high frequency input connection, a first high frequency output connection, and a first high frequency enable connection wherein: the first high frequency input connection is electrically connected to a first high frequency voltage source; the first high frequency output connection is electrically connected to the first connection point of the coil; and the first high frequency enable connection is electrically connected to a first high frequency clock source.

The high frequency switch circuit also comprises a second high frequency switch comprising a second high frequency input connection, a second high frequency output connection, and a second high frequency enable connection wherein: the second high frequency input connection is electrically connected to the first high frequency voltage source; the second high frequency output connection is electrically connected to the second connection point of the coil; and the second high frequency enable connection is electrically connected to a second high frequency clock source.

The transmit circuit also comprises a common switch circuit comprising a first common switch comprising a first common input connection, a first common output connection, and a first common enable connection wherein: the first common input connection is electrically connected to a first common voltage source; the first common output connection is electrically connected to the first connection point of the coil; and the first common enable connection is electrically connected to the second low frequency clock source and the second high frequency clock source. In one example, the first common voltage source provides an electrical connection to ground.

The transmit circuit also comprises a second common switch comprising a second common input connection, a second common output connection, and a second common enable connection wherein: the second common input connection is electrically connected to the first common voltage source; the second common output connection is electrically connected to the second connection point of the coil; and the second common enable connection is electrically connected to the first low frequency clock source and the first high frequency clock source.

While embodiments of the present disclosure have been described as having exemplary designs, the present invention may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A method of transmitting a magnetic field in a metal detector, comprising:
receiving, by a plurality of switching elements connecting supply voltages across one or more transmit inductance coils, one or more transmit clock signals;
in response to receiving the one or more transmit clock signals, driving current to the one or more transmit inductance coils by enabling the one or more of the plurality of switching elements to provide the supply voltages across the one or more transmit inductance coils causing a plurality of repeating sequences of currents to be applied through the one or more transmit inductance coils wherein each of the repeating sequences of currents is associated with a frequency and provides half-slopes of current to the one or more transmit inductance coils, wherein the half-slopes of current comprise a substantially linear positive-sloped half-slope of current and a substantially equal and linear negative-sloped half-slope of current; and
dispersing a frequency associated with a first repeating sequence of current of the plurality of repeating sequences of current among other frequencies associated with one or more other repeating sequences of currents of the plurality of repeating sequences of current, wherein amplitudes of the supply voltages are different for the frequency and the one or more other frequencies.

2. The method in claim 1, in which the plurality of half-slopes of current of a repeating sequence of current associated with a given frequency are sequential.

3. The method in claim 1 comprising selecting the number of plurality of repeating sequences of currents by a user.

4. The method in claim 1 comprising selecting the frequency associated with each of the repeating sequences of currents by a user.

5. The method in claim 1 comprising automatically selecting the frequencies in response to a preferred operating mode.

6. The method in claim 1 comprising automatically selecting the frequencies in response to detecting operating conditions.

7. The method in claim 1 comprising shifting all frequencies associated with the plurality of repeating sequences of current by a proportional amount, the proportional amount being less than 1%, to minimize interferers.

8. The method in claim 1, comprising independently shifting each frequency of the plurality of repeating sequences of current by an amount, the amount being less than 1%, to minimize interferers.

9. The method in claim 7, comprising selecting a frequency shift by a user.

10. The method in claim 7, comprising selecting a frequency shift by a detector in response to interference levels determined by a receiver circuit.

11. The method in claim 1, comprising balancing signal strengths of the plurality of frequencies associated with the plurality of repeating sequences of current such that their signal strengths as measured in a spectral measurement are approximately equal.

12. The method in claim 1, comprising intentionally unbalancing strengths of the plurality of frequencies associated with the plurality of repeating sequences of current to provide more signal strength to a more desired frequency than another.

13. The method in claim 12, comprising selecting relative signal strengths of the plurality of frequencies by the user.

14. The method in claim 12, comprising automatically controlling relative signal strengths of the plurality of frequencies by the metal detector.

15. The method in claim 14, comprising determining the relative signal strengths of the plurality of frequencies based on ground conditions.

16. The method in claim 1, in which at least one of the supply voltages is a bipolar supply voltage.

17. The method in claim 1, in which at least one of the supply voltages is a unipolar supply voltage.

18. The method in claim 1, in which at least one of the supply voltages includes an appropriate capacitor for power recycling.

19. The method in claim 1, in which residual non-linearities of the half-slopes of current of a given frequency associated with a first repeating sequence of current of the plurality of repeating sequences of current are compensated by variations in the corresponding power supply.

20. The method in claim 1, comprising measuring peak current levels of driven current to the one or more transmit inductance coils, in which a measured peak current level is used to adjust a corresponding power supply voltage.

21. The method of claim 20, comprising adjusting the corresponding power supply voltage to compensate for coil manufacturing variations.

22. The method of claim 20, comprising adjusting the corresponding power supply voltage to compensate for ground mineralization.

23. The method in claim 1, in which the plurality of switching elements include one or more high-side switching elements and one or more low-side switching elements.

24. The method in claim 23, in which the low-side switching elements include NMOS devices.

25. The method in claim 24, in which the low-side switching elements are driven by logic gates whose inputs are high-side clock signals of the one or more transmit clock signals.

26. The method in claim 23, in which the high-side switching elements include PMOS devices.

27. The method in claim 26, in which the high-side switching elements include high-voltage reverse-conduction blocking elements.

28. The method in claim 26, in which a high-side switching element of the high-side switching elements is comprised of back-to-back PMOS devices.

29. The method in claim 23, in which the one or more high-side switching elements is comprised of back-to-back NMOS devices.

30. The method in claim 1, comprising a receiver circuit connected to one or more receive inductance coils, in which the one or more receive inductance coils produces one or more voltages in response to a received magnetic field signal, wherein the receiver circuit receives a receive demodulator clock signal to synchronously demodulate the one or more voltages to produce one or more demodulated outputs.

31. The method in claim 30, whereby a randomized timing jitter is applied to a transmit clock signal, and a coherent jitter is applied to the appropriate receiver demodulator clock signal.

32. The method in claim 30, whereby a frequency offset is applied to a transmit clock signal, and a coherent frequency offset is applied to the appropriate receiver demodulator clock signal.

33. The method in claim 29, whereby the jitter or offset is applied to all frequencies.

34. The method in claim 29, whereby the jitter or offset is applied to select frequencies.

35. A method of transmitting a magnetic field in a metal detector, comprising:
receiving, by a plurality of switching elements connecting a supply voltage across one or more transmit inductance coils, one or more transmit clock signals;
in response to receiving the one or more transmit clock signals, driving current to the one or more transmit inductance coils by enabling the one or more of the plurality of switching elements to provide the supply voltage across the one or more transmit inductance coils causing a plurality of repeating sequences of currents to be applied through the one or more transmit inductance coils wherein each of the repeating sequences of currents is associated with a frequency and provides half-slopes of current to the one or more transmit inductance coils, wherein the half-slopes of current comprise a substantially linear positive-sloped half-slope of current and a substantially equal and linear negative-sloped half-slope of current; and
independently shifting each frequency of the plurality of repeating sequences of current by an amount, the amount being a positive value less than 1%, to minimize interferers.

36. A method of transmitting a magnetic field in a metal detector, comprising:
receiving, by a plurality of switching elements connecting a supply voltage across one or more transmit inductance coils, one or more transmit clock signals;
in response to receiving the one or more transmit clock signals, driving current to the one or more transmit inductance coils by enabling the one or more of the plurality of switching elements to provide the supply voltage across the one or more transmit inductance coils causing a plurality of repeating sequences of currents to be applied through the one or more transmit inductance coils wherein each of the repeating sequences of currents is associated with a frequency and provides half-slopes of current to the one or more transmit inductance coils, wherein the half-slopes of current comprise a substantially linear positive-sloped half-slope of current and a substantially equal and linear negative-sloped half-slope of current; and
a receiver circuit connected to one or more receive inductance coils, in which the one or more receive inductance coils produces one or more voltages in response to a received magnetic field signal, wherein the receiver circuit receives a receive demodulator clock signal to synchronously demodulate the one or more voltages to produce one or more demodulated outputs, whereby a randomized timing jitter is applied to a transmit clock signal, and a coherent jitter is applied to the appropriate receiver demodulator clock signal.

37. A method of transmitting a magnetic field in a metal detector, comprising:
receiving, by a plurality of switching elements connecting a supply voltage across one or more transmit inductance coils, one or more transmit clock signals;
in response to receiving the one or more transmit clock signals, driving current to the one or more transmit inductance coils by enabling the one or more of the plurality of switching elements to provide the supply voltage across the one or more transmit inductance coils causing a plurality of repeating sequences of currents to be applied through the one or more transmit inductance coils wherein each of the repeating sequences of currents is associated with a frequency and provides half-slopes of current to the one or more transmit inductance coils, wherein the half-slopes of current comprise a substantially linear positive-sloped half-slope of current and a substantially equal and linear negative-sloped half-slope of current; and
a receiver circuit connected to one or more receive inductance coils, in which the one or more receive inductance coils produces one or more voltages in response to a received magnetic field signal, wherein the receiver circuit receives a receive demodulator clock signal to synchronously demodulate the one or more voltages to produce one or more demodulated outputs, whereby a frequency offset is applied to a transmit clock signal, and a coherent frequency offset is applied to the appropriate receiver demodulator clock signal.

* * * * *